Figure 1:
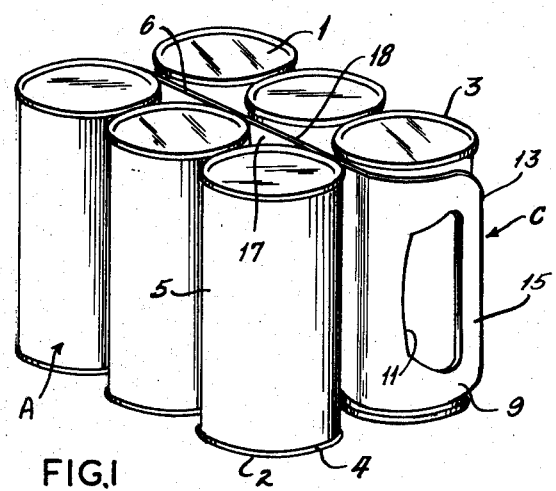

Oct. 8, 1963 — V. H. CHATTEN — 3,106,289

ARTICLE CARRIER

Filed Sept. 19, 1960 — 4 Sheets-Sheet 1

INVENTOR.
VICTOR H. CHATTEN
BY
Gravely, Lieder & Woodruff
ATTORNEYS.

Oct. 8, 1963  V. H. CHATTEN  3,106,289
ARTICLE CARRIER
Filed Sept. 19, 1960  4 Sheets-Sheet 2

INVENTOR.
VICTOR H. CHATTEN
BY
Gravely, Lieder & Woodruff
ATTORNEYS.

Oct. 8, 1963 V. H. CHATTEN 3,106,289
ARTICLE CARRIER
Filed Sept. 19, 1960 4 Sheets-Sheet 3
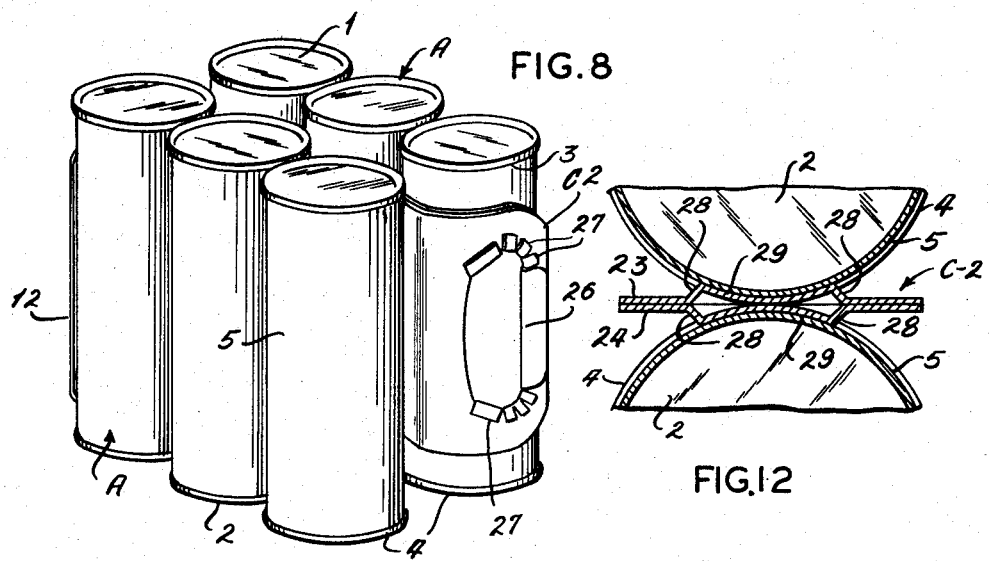
FIG. 8
FIG. 12
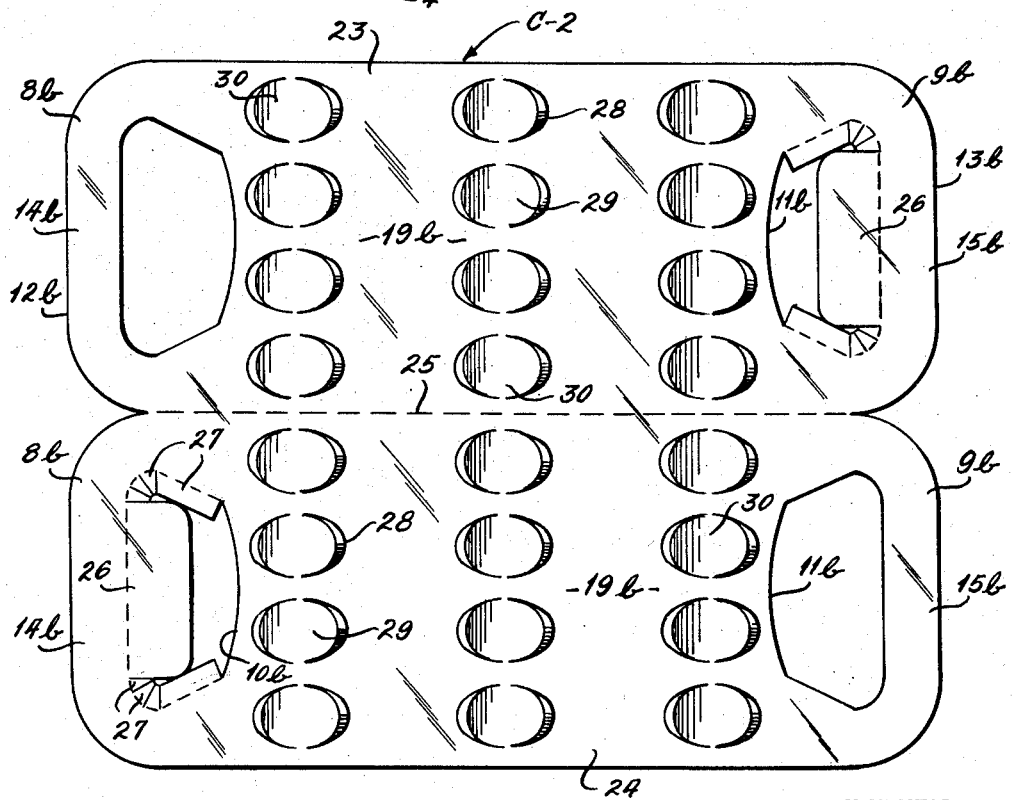
FIG. 9
INVENTOR.
VICTOR H. CHATTEN
BY
Gravely, Lieder & Woodruff
ATTORNEYS.

Oct. 8, 1963 V. H. CHATTEN 3,106,289
ARTICLE CARRIER
Filed Sept. 19, 1960 4 Sheets-Sheet 4

INVENTOR.
VICTOR H. CHATTEN
BY
Gravely, Lieder & Woodruff
ATTORNEYS.

United States Patent Office 3,106,289
Patented Oct. 8, 1963

1

3,106,289
ARTICLE CARRIER

Victor H. Chatten, Torrance, Calif., assignor to Anheuser-Busch, Incorporated, St. Louis, Mo., a corporation of Missouri Filed Sept. 19, 1960, Ser. No. 56,761
5 Claims. (Cl. 206—65)

This invention relates to a new kind of article carrier for carrying cans or similar containers filled with beer or other food products or other articles, and to the package formed thereby. In particular, this invention relates to an article carrier which is relatively small and whose greater portion is hidden between the cans which it carries, thereby fully exposing the labels on said cans.

At the present time, there are numerous kinds of cartons, carriers, or boxes for carrying a plurality of cans or similar articles. These cartons require a relatively great amount of paperboard or other expensive material which is folded to receive the cans or folded around the cans in band-like fashion. Expensive equipment is required to load or package such devices. Other cartons have been designed to be glued to the tops of cans or the like, but these generally leave glue and/or paperboard at an area on the can from which a person might drink, if the can contains beer, soda, juice, etc.

One of the principal objects of the present invention is to provide a carrier which requires less material than cartons now in general use. Another object is to provide an inexpensive carrier which is small but which has a handle at one or both ends and which is capable of holding a plurality of cans.

Still another object is to provide a carton which can be assembled in quick and simple fashion to a plurality of cans by high speed automatic equipment. Another object is to provide a carrier which does not require expensive art work to be placed thereon and which gives maximum exposure for the labels and trademarks of the individual articles to be carried. Another object is to provide a carrier adhesively secured to a plurality of cans along the side walls thereof only at points inwardly of the ends of the cans thereby leaving both ends of the cans, as well as a substanital portion of the cylindrical wall adjacent to each end, free from adhesive. This enables a person to drink directly from the can if desired without his lips contacting adhesive material or paperboard or plastic which might remain after the can has been removed from the carrier. Another object is to provide a package which takes less shelf space in the refrigerator, since the package can be conveniently placed on one end by means of a handle extending outwardly from the other end. Still another object is to provide a carrier which enables a person to remove frozen packages from the freezer without contacting them with the hand.

These and other objects and advantages will become apparent hereinafter.

The present invention is embodied in an article carrier positioned adjacent to one row or between two rows of cans or other articles, said carrier having means thereon for contacting said articles with an adhesive therebetween. The carrier may be provided with a carrying handle along one or more margins. This handle may be curved to lie flat against the periphery of one of the end cans. The invention is also embodied in the entire package consisting of the carrier and articles with an adhesive material therebetween.

The invention also consists in the parts and in the arrangements and combinations of parts hereinafter described and claimed. In the accompanying drawings which form part of this specification and wherein like numerals refer to like parts wherever they occur:

2

FIG. 1 is a perspective view of a package embodying my invention showing six cans in two opposing rows of three cans each, with a carrier embodying my invention therebetween.

Figure 5:
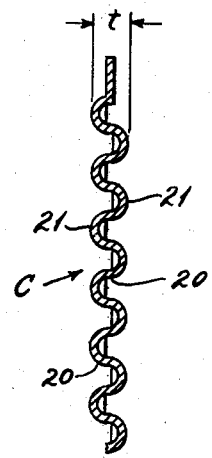
Figure 2:
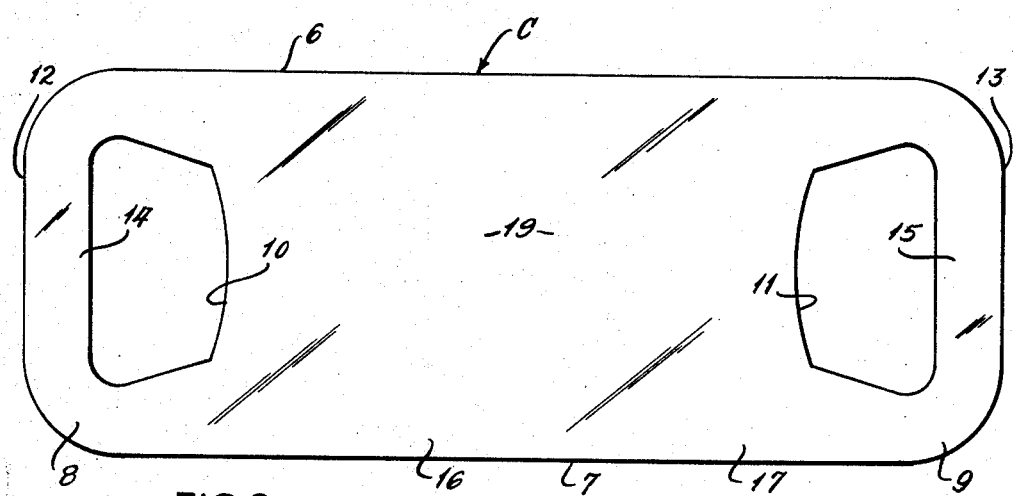
Figure 6:
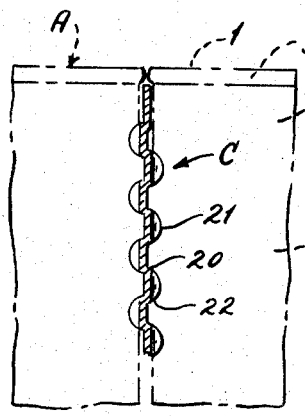
Figure 7:
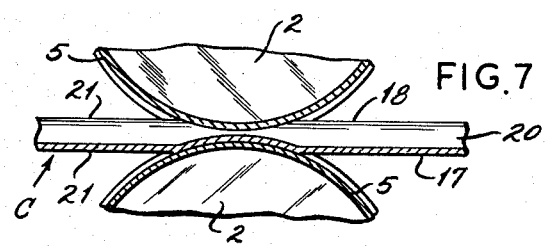
Figure 3:
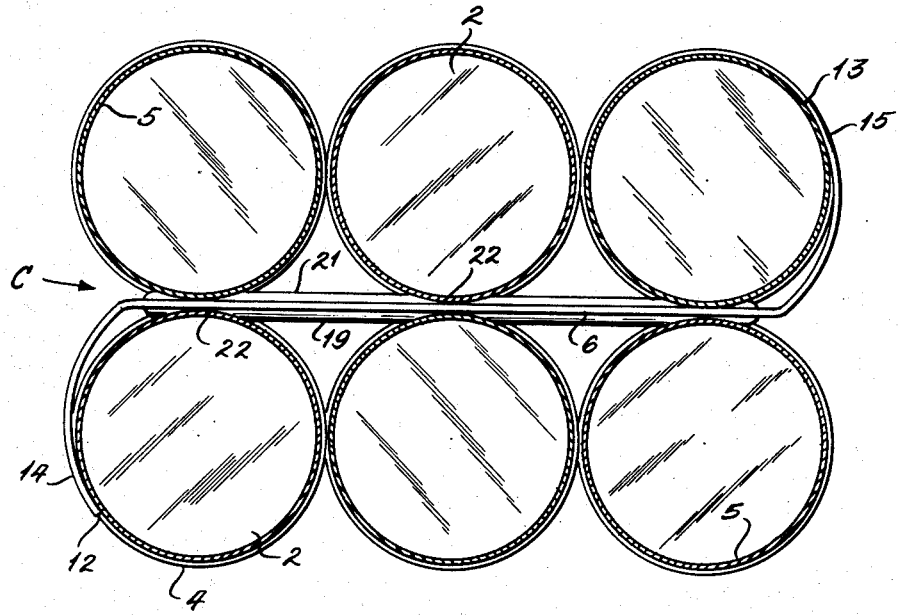
Figure 4:
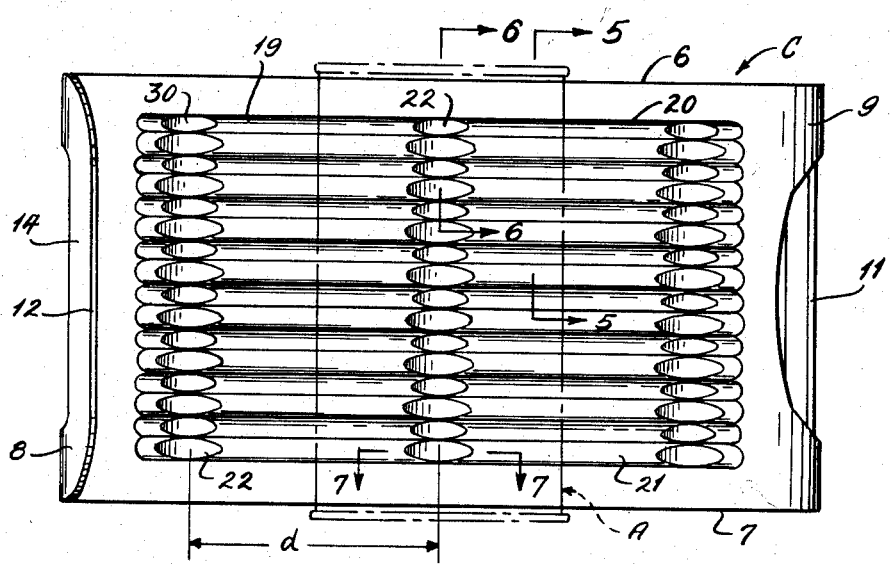

FIG. 2 is a plan view of the carrier blank itself before being formed for receiving cans or articles, FIG. 3 is a top plan view of a package showing my new carrier positioned between two rows of aligned cans, shown in section, with a handle at each end, FIG. 4 is a side elevational view of the corrugated carrier shown in FIG. 3, with one can shown in dotted lines, FIG. 5 is a vertical cross-sectional view taken along the corrugations or along the line 5—5 of FIG. 4, FIG. 6 is a vertical cross-sectional view taken along the recesses in the corrugations or along the line 6—6 of FIG. 4 and showing two cans in dotted lines, FIG. 7 is a fragmentary cross-sectional view taken along the line 7—7 of FIG. 4 showing two oppositely positioned cans each embedded in a recess in the corrugated surface of the carrier.

Figure 10:
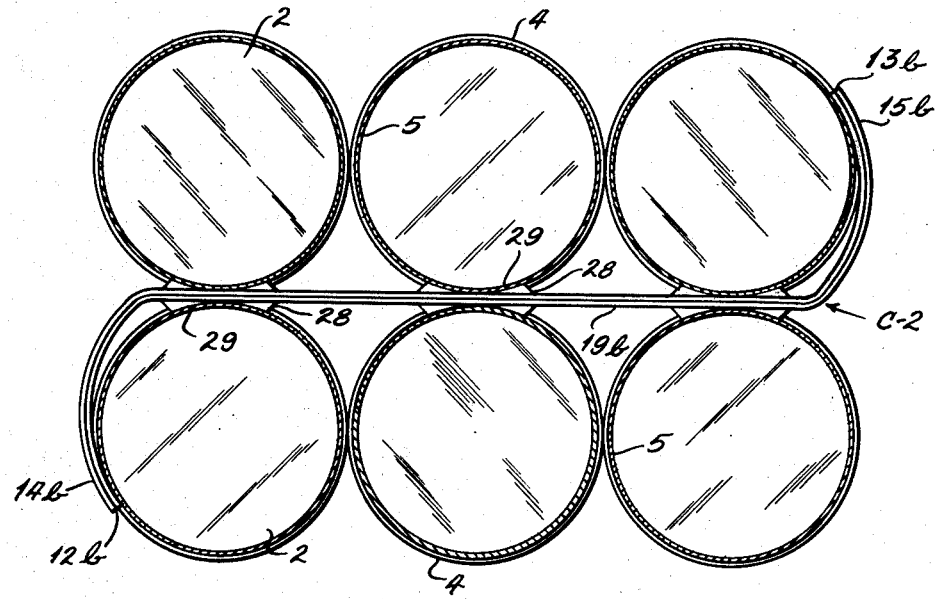
Figure 11:
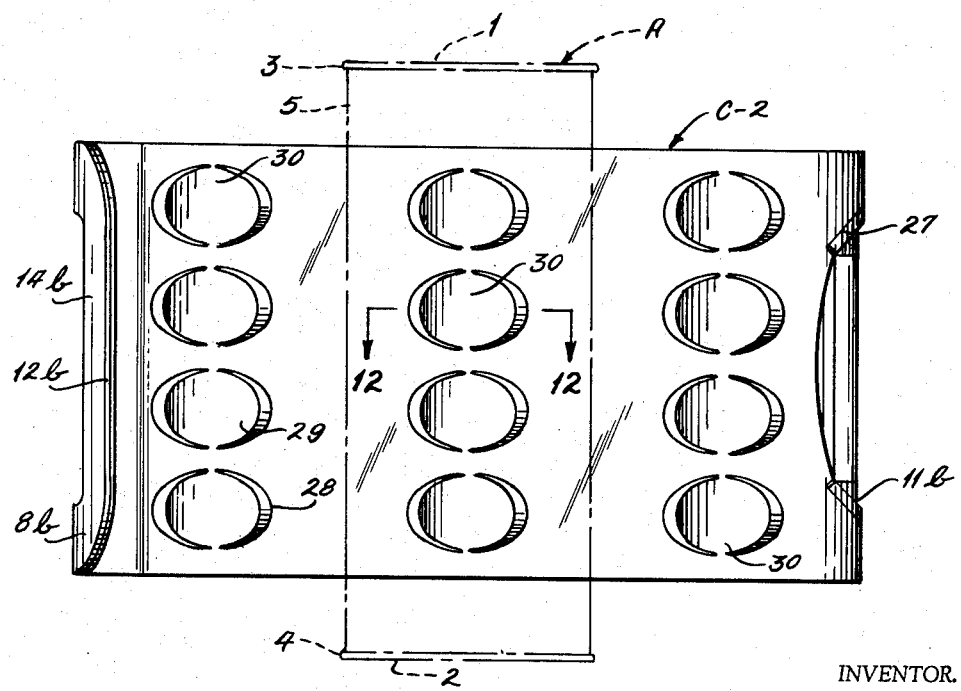

FIG. 8 is a perspective view of a package having a modified carrier therein,

FIG. 9 is a plan view of the blank for the modified carrier shown in FIG. 8, said blank having curved embossments with recesses therein for receiving the curvature of the cans, FIG. 10 is a top plan view of the modified carrier shown in FIG. 9 properly assembled and receiving two aligned rows of cans which are shown in section, FIG. 11 is a side elevational view of the modified carrier showing one can in dotted lines, and FIG. 12 is a fragmentary view taken along the line 12—12 of FIG. 11 showing two oppositely positioned cans adhesively mounted in the curved recesses of the carrier.

The present invention is shown embodied in an article carrier C made from suitable material. This material should have high wet strength and preferably should be waterproof. It should preferably be relatively rigid and should have a properly prepared surface, such as with fine needle-like holes or sand-like, for reasons which will become apparent hereinafter.

As shown in FIG. 1, the articles A may be cans which have top portions 1 and bottom portions 2 with beads or rims 3 and 4 therearound and a cylindrical wall 5 therebetween. Such cans are in common use for beer, soda, juices, nuts, vegetables, and other food products (conventional or frozen) as well as for other products such as oil, etc. It is understood, however, that the articles A may be cans or containers having little or no rim or bead, such as evaporated milk cans. Also, the articles A may be cylindrical or polygonal or tubular containers for soap powder, hardware, automotive parts, etc., either with or without rims or beads. The articles A should not be provided with relatively light and weak paper labels which might tear, and preferably should have the label painted thereon or permanently and rigidly affixed thereto.

The blank for the article carrier C shown in FIG. 2 is substantially rectangular and has an upper margin 6 and a lower margin 7 with end portions 8 and 9 each having a handhole 10 and 11 therein inwardly of end margins 12 and 13 forming carrying handles 14 and 15 therebetween. If desired, one or both of the end portions 8 or 9 can be eliminated. The carrier C forms a wall 16 having two opposite side portions 17 and 18. The carrier C has a central portion 19 adapted to receive one or more articles A such as cans in one or two rows. That is, articles can be attached to one or both side portions 17 and 18.

FIG. 4 shows a carrier C properly formed and ready to receive the cans A. The central portion 19 is corrugated to form corrugations or raised portions 20 each having a crest 21. At spaced intervals or distances *d*, these raised portions 20 are depressed to form recesses 22 which are vertically aligned and which are adapted to receive the wall 5 of the articles A to be carried. The corrugated central portion 19 shown in FIG. 4 gives extra thickness to the paperboard material so that the distance *t* between the crests 21 of the oppositely extending corrugations 20 is slightly more than twice the distance which the outer edge of the bead or rim 3 or 4 extends beyond the outer cylindrical surface 5 of the can A. The greater the projection of the corrugations 21, the greater the bonding surface of the recesses 22. Therefore, the depth of the corrugations 20 and the distance between the crests 21 is important since these influence the size of the bonding surfaces presented by the recesses 22. With the foregoing carrier, each end of each can remains uncovered so that the packages can be stacked with the cans directly on one another without any material therebetween.

A modified carrier C-2 is shown in FIGS. 8-12. In this form, the carrier C-2 is of double thickness and has two sections 23 and 24 which are folded together along the central hinge line 25. The handhole 10*b* of one section 24 has a central member 26 and edge members 27 which are adapted to be folded through and secured to the margin surrounding the handhole 10*b* of the opposite section 23. The other end portion 9*b* of the carrier C-2 has similar members 26 and 27 in the handhole in the opposite section 23. These members secure the sections together and provide an extra thickness of the handhole to make the package more comfortable to carry with the fingers.

The two sections 23 and 24 should preferably be adhesively secured together to form a double thickness which will not come apart. Each section 23 and 24 is provided with a plurality of embossments or raised portions 28 in vertical alignment. The central portion of each embossment 28 has a recess 29 perferably of the same curvature, or slightly greater curvature than, as the article or can A to be carried. A plurality of recesses 29 is provided for each can. These recesses are aligned vertically and their centers are spaced one article width or diameter laterally from the center of the next adjacent plurality of vertically aligned recesses 29, so that the articles A in the same row are in contacting relation with each other. The articles A in opposite rows are also preferably in contacting relation but may be spaced apart slightly depending upon the thickness of the central portion of the carrier. The vertical distance between the upper and lower embossments 28 for holding one can, or between the upper and lower recesses 22, constitutes the vertical height of an interrupted glue line 30 which holds the can to the carrier.

It is apparent from FIGS. 3 and 10 that the package is carried by one of the handles 14 or 15 at the end so that the cans A are normally carried in a horizontal position. If placed in a refrigerator in this position, a package of six 12 ounce beer cans occupies about one-third less space than if the cans are placed therein in an upright position, and a package of eight 12 ounce cans occupies about half the space. To carry the package, the fingers are inserted between the handle 14 or 15 and the adjacent can thereby bending the handle into the plane of the central portion 19, since the weight of the cans is sufficient to straighten the curved end portion 8 or 9 which contains the handle 14 or 15. The carrier C, the articles A, and the package formed have been shown and described, and set forth in some claims, in a position wherein the carrier and the articles are in an upright or an upstanding position, but it is understood that the package is normally carried by the handle with the articles in a horizontal position and may be positioned on a shelf or in the refrigerator on an end, on the side, or on the bottoms of the articles.

The adhesive or glue used to form a bond between the cans and the paperboard or plastic carrier should preferably not stick to the can or have an odor. It may be of the pressure-senstive or other type. It should not contact the can anywhere near a place where the human lips might touch the surface of a can, such as a beer or soda can where the contents are drunk directly from the top or bottom edge of the can. With such cans, the adhesive should preferably terminate at least ¾ of an inch from the top and bottom of the can. The adhesive should be immune from heat, cold, and should not deteriorate over a period of time. The adhesive should not be soluble in water and should form a permanent bond between the carrier and the can until the cans are released by pulling and/or twisting them from the carrier.

In instances where the contents of the cans are not drunk from the can as with beer and soda, and where the contents are immediately dispensed into another container, such as with canned vegetables, etc., the glue line or vertically aligned recesses may extend throughout the full height of the can. Obviously, other contents such as oil, cleanser powders, etc. which are not consumed internally by humans, can be secured to the carrier by a glue line extending the full height of the can. It is only where the contents are drunk directly from the can that the glue line should terminate short of the top and bottom thereof so as to assure a clean surface for the lips of the person drinking therefrom.

The material used for the carrier may be paperboard of various types, plastic, and/or foam-like material, or any other suitable material. It is important that this material be waterproof or have a high wet strength so hat the carton does not weaken or disintegrate in dampness or when contacted by water or moisture. Either the material itself or the raised means thereon must be slightly greater in thickness than twice the amount which the rim overlaps the can, as best shown in FIGS. 3, 7, 10 and 12, so as to make certain that the cans are properly glued to the carrier with sufficient force before the rims 3 and 4 thereof contact each other. This increased thickness can be obtained by corrugating the material as shown in FIG. 4, or by providing separate embossments and recesses as shown in FIG. 9, or by other means. If desired, continuous or intermittent vertical enlargements along the glue line can be provided or the material itself may be of sufficient thickness throughout, but the latter might increase the expense of the material for the carrier. Providing a double thickness carrier, such as shown in FIG. 9, allows the corrugations or embossments therein to be of reduced height, or eliminated entirely if the material is initially sufficiently thick.

The surface of the material in combination with the kind of adhesive used therewith should be such that the adhesive will have a greater affinity for the carrier than for the can, so that when the can is removed it will be free from adhesive and the adhesive will remain on the carrier.

This invention is intended to cover all changes and modifications of the examples of the invention herein chosen for purposes of the disclosure, which do not constitute departures from the spirit and scope of the invention.

What is claimed is:

1. An article carrier for holding cylindrical articles together in an upright position, said carrier comprising an upstanding substantially rectangular wall having an upper margin and a lower margin with end portions having an end margin thereon, a handhole positioned inwardly of at least one of said end margins, a central portion positioned between said margins and adapted to receive a portion of each of said articles along an upstanding cylindrical portion thereof, said end portions being curved so as to tend to lie against the cylindrical periphery of the articles to be carried, said central portion having raised means thereon adapted to receive an adhesive for attaching said cylindrical articles to said carrier, said raised means having portions which are raised substantially the same amount and which are in vertical alignment at spaced intervals for receiving said portion of each of said cylindrical articles.

2. A package comprising an upstanding article carrier and a plurality of cylindrical cans positioned in aligned relation in two parallel rows, said cans each having a top and a bottom with a rim therearound and a cylindrical wall therebetween, said article carrier being adhesively secured to said cans inwardly of said top and bottom rims of said cans and extending over a major portion between said ends, said carrier being substantially rectangular and relatively flat and having raised means thereon inwardly of the end margins for contacting a portion of the cylindrical wall of each can along a vertical line, the rims of cans in the same row being in substantial contacting relation, the rims of cans of one row being spaced slightly from the rims of the cans in the other row, said carrier having end portions each having a carrying handle thereon extending outwardly beyond the ends of the rows of cans, said handles being normally curved to be adjacent to the cylindrical wall of one of the end cans, and an adhesive material positioned between said means on said carrier and said cans for holding said cans and said carrier in fixed relation to one another.

3. A package comprising an article carrier and a plurality of relatively heavy articles positioned in aligned relation in an upright position in two parallel rows, said articles each having ends with an upstanding portion therebetween, said carrier comprising an upstanding wall having an upper margin and a lower margin with an end portion having an end margin thereon, said carrier having a height less than the height of said articles and positioned between the ends of said articles, carrying means positioned inwardly of said end margins, said carrier having a central portion positioned inwardly of said margins and having a plurality of spaced article receiving means which project outwardly from said upstanding wall, an adhesive between said means and said articles for attaching said articles to said carrier, said outwardly projecting means being in vertical alignment at laterally spaced intervals for receiving a portion of said articles inwardly of the ends thereof.

4. An article carrier for holding articles in a fixed position, said carrier not extending beyond the tops and bottoms of said articles and comprising an upstanding wall having an upper margin and a lower margin with an end portion having an end margin thereon, a central portion positioned between said margins and adapted to receive a portion of each of said articles along an upstanding portion thereof, said central portion having means thereon adapted to receive an adhesive thereon, said means having portions thereon which are raised substantially the same amount for receiving a portion of each of said articles, said means comprising corrugations which extend horizontally a distance at least as great as the distance between the centers of the articles at each end of the row which said carrier is to hold, the crests of said corrugations having preformed recesses therein for receiving the curved wall of the article to be carried, said recesses being vertically aligned to form a line of recesses for each article to be carried.

5. An article carrier for holding articles in a fixed position, said carrier not extending beyond the tops and bottoms of said articles and comprising an upstanding wall having an upper margin and a lower margin with an end portion having an end margin thereon, a central portion positioned between said margins and adapted to receive a portion of each of said articles along an upstanding portion thereof, said central portion having means thereon adapted to receive an adhesive thereon, said means having portions thereon which are raised substantially the same amount for receiving a portion of each of said articles, said means comprising a plurality of embossments for receiving the curved walls of articles to be carried, there being at least two vertically aligned embossments for each article to be carried, each of said embossments having a preformed curved recess therein for receiving the curved wall of the article to be carried, said recesses being provided with an adhesive material for holding said articles.

References Cited in the file of this patent

UNITED STATES PATENTS

| | | |
|---|---|---|
| 1,026,359 | Miller | May 14, 1912 |
| 2,677,460 | Johnson | May 4, 1954 |
| 2,744,624 | Hoogstoel et al. | May 8, 1956 |
| 2,769,535 | Bruce | Nov. 6, 1956 |
| 2,821,299 | Crary | Jan. 28, 1958 |
| 2,917,876 | Clapp | Dec. 22, 1959 |

FOREIGN PATENTS

| | | |
|---|---|---|
| 26,878 | Great Britain | 1913 |
| 926,698 | Germany | Apr. 21, 1955 |
| 763,312 | Great Britain | Dec. 12, 1956 |